G. H. CRAWFORD.
METHOD AND APPARATUS FOR MEASURING THE CAPACITY OF REFRIGERATING PLANTS.
APPLICATION FILED SEPT. 7, 1918.
1,349,409.
Patented Aug. 10, 1920.
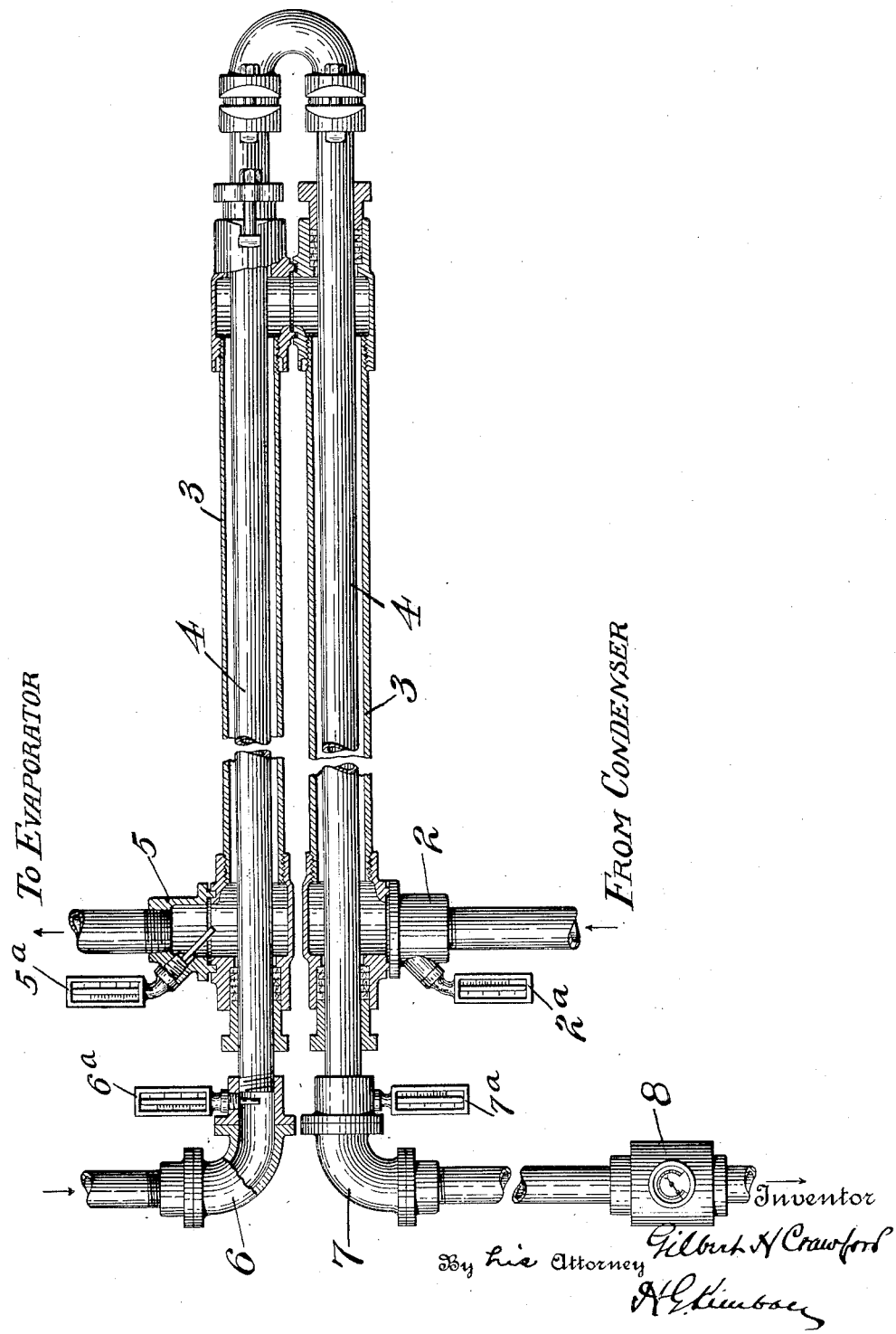

UNITED STATES PATENT OFFICE.

GILBERT H. CRAWFORD, OF BROOKLYN, NEW YORK, ASSIGNOR TO DE LA VERGNE MACHINE COMPANY, OF NEW YORK, N. Y., A CORPORATION OF NEW YORK.

METHOD AND APPARATUS FOR MEASURING THE CAPACITY OF REFRIGERATING PLANTS.

1,349,409.     Specification of Letters Patent.     Patented Aug. 10, 1920.

Application filed September 7, 1918. Serial No. 253,090.

*To all whom it may concern:*

Be it known that I, GILBERT H. CRAWFORD, United States citizen, residing in Brooklyn, New York, have invented the following described Improvements in Methods and Apparatus for Measuring the Capacity of Refrigerating Plants.

The invention relates to a method and apparatus for ascertaining the capacity of systems of mechanical refrigeration and provides a means whereby the operator may readily measure the refrigerating effect at any time and whereby certain improvements are incidentally effected in the refrigerating process. I obtain this result by measurement of the rate of flow of the liquid refrigerant toward the evaporator or expansion coil and without disturbance of such flow and by means of very simple apparatus one form of which is illustrated in the accompanying drawing. The said illustration is more or less diagrammatic and is partly in section and partly in elevation.

The said apparatus is essentially a heat exchanger and as such is capable of construction in a wide variety of different forms. It is disposed in the so-called liquid line of the refrigerating system and in the case in hand, consists as shown of one or more sections of double tubes or pipes, concentrically assembled, and respectively connected by return bend fittings at their ends whereby the liquid refrigerant may flow in a sufficiently intimate heat exchanging relation to a body or a circulation of some other liquid medium of known thermal characteristics. The refrigerating liquid, relatively warm from the condenser, is admitted through fitting 2 to one of the pipes of the heat exchanger, for example to the outer pipe 3 wherein it surrounds and flows over and along the outside of the inner pipe 4, through the junction fitting at the end and leaves by an outlet fitting 5 whence it passes to the evaporator or expansion coil. The other liquid medium which may be water, brine or other liquid medium and preferably one which is cooler than the refrigerant, enters the inner pipe 4 through the fitting 6 and leaves by the fitting 7 whence it passes through a liquid meter 8. The heat exchanger thus provides two courses through it, one for the refrigerating liquid to be measured and the other for the other medium to be used in the measurement. When brine is selected as the medium to flow in heat-exchanging relation to the refrigerant the other course may be connected to or form part of the ordinary brine circulation system commonly used in ice making plants. Being cooler than the refrigerant it will obviously absorb heat from the latter during its course through the exchanger and thereby correspondingly improve the refrigerating efficiency of the system as will be plain to those skilled in this art. Best results will be obtained when the apparatus thus described is well insulated against loss of heat but such insulation is omitted from the drawings.

Each inlet and exit fitting for each course through the heat exchanger is provided with a thermometer well or a thermometer indicated respectively at $2^a$, $5^a$, $6^a$ and $7^a$, whereby the entering and leaving temperatures of the liquid may be observed and read by the operator. The liquid meter is preferably organized to read in terms of rate rather than quantity, but any means of identifying the mass of the liquid which receives and absorbs the transferred heat may be used in place of the meter, or such factor may be already known and taken as a constant for all measurements.

The method of measurement is as follows, assuming the cooling fluid in pipe 4 to be water, the specific heat of which is 1, and the refrigerant to be liquid ammonia, the specific heat of which at the particular condenser pressure at which the system is operating, may be, say, 1.1. If the thermometric indications at the ammonia inlet and exit connections, $2^a$ and $5^a$, show a difference of 30° and the indications at the water inlet and exit connections, $6^a$ and $7^a$, show a difference of 25°, and if the rate of flow of the water as shown by the meter 8 is 100 pounds per minute, then the rate of flow of liquid refrigerant circulated per minute can be determined by the rule governing the temperature of mixed fluids, viz., that the product of the temperature change, the specific heat and the weight (rate of flow in pounds) of one liquid, is equal to the product of the corresponding factors in the other liquid. Thus with the figures taken for illustration, 30 (temperature change of ammonia) times 1.1 (the specific heat of liquid ammonia) times X (its rate of flow in pounds per minute) equals 25 (the temperature change of the water) times 1 (its specific heat) times 100 (its rate of flow in pounds per minute). Solving the value of X, the rate of flow of the liquid ammonia would be 75.7 pounds per minute which rate is manifestly an accurate indication of the refrigerating capacity.

It will be apparent that the foregoing law and formula may be applied to the flowing refrigerant with various amplifications, additions, substitutions or reversals of the steps and procedure, all of which will include the underlying principle of measurement above fully explained.

Claims:

1. A method of measuring the rate of flow of liquid refrigerants which consists in bringing into heat-exchanging relation with the refrigerant a medium of known amount and thermal characteristics, ascertaining the temperature change of such medium and comparing such change with the resulting temperature change of the refrigerant.

2. A method of measuring the rate of flow of liquid refrigerants which consists in ascertaining the temperature change of a medium of known thermal characteristics flowing at a known rate in heat-exchanging relation therewith and comparing such temperature change with the temperature change of the refrigerant.

3. The method of measuring the rate of flow of liquid refrigerants in a refrigerating system, consisting in bringing the refrigerant into heat exchanging relation to another medium and measuring the amount of heat so transferred and the temperature change of the liquid refrigerant.

4. The method of measuring liquid refrigerant circulating in a refrigerating system, consisting in bringing the refrigerant into heat exchanging relation to another medium flowing at known rate and measuring the temperature changes of the refrigerant and of the flowing medium.

5. A method of measuring the capacity of mechanical refrigerating systems which consists in causing heat to be transferred from the flowing liquid refrigerating medium, at a point in its course between the condenser and the evaporator, to a part of a circulating water system and comparing the temperature change and rate of flow of the water with the temperature change of the refrigerating medium.

6. Apparatus for measuring the capacity of mechanical refrigerating systems comprising a heat-exchanger provided with separate courses for liquid refrigerant and another medium and provided with means for indicating the temperature difference at the inlet and exit of each course with means for measuring mass or rate of flow of the other medium.

7. Apparatus for measuring the capacity of mechanical refrigerating systems comprising a heat-exchanger interposed in the liquid line and provided with one course for the liquid refrigerant and another connected to a circulating water system and means for indicating the temperature differences between the inlet and exit of each course and the mass or rate of flow of the water.

8. Apparatus for measuring the capacity of mechanical refrigerating systems comprising in combination a heat-exchanger interposed in the liquid line and provided with one course for liquid refrigerant and another for circulating water, means for indicating the temperature difference between the inlet and exit of each course and a meter for the water circulation.

In testimony whereof, I have signed this specification.

GILBERT H. CRAWFORD.